(12) United States Patent
Clark

(10) Patent No.: US 6,533,487 B2
(45) Date of Patent: Mar. 18, 2003

(54) SPRING ROD END CLIP ENGAGING A RANGE OF PANEL THICKNESSES

(75) Inventor: Sylvester S. Clark, Lansing, IL (US)

(73) Assignee: Illinois Tool Works Inc., Glenview, IL (US)

( * ) Notice: Subject to any disclaimer, the term of this patent is extended or adjusted under 35 U.S.C. 154(b) by 6 days.

(21) Appl. No.: 09/797,290

(22) Filed: Mar. 1, 2001

(65) Prior Publication Data

US 2002/0122689 A1 Sep. 5, 2002

(51) Int. Cl.⁷ .................................................. E05B 9/08
(52) U.S. Cl. .................... 403/71; 411/509; 411/510; 411/913; 411/45; 403/187; 403/196
(58) Field of Search ................................ 411/508, 509, 411/510, 913, 45, 46, 48; 403/13, 14, 70, 71, 187, 196, 326, 328, 329

(56) References Cited

U.S. PATENT DOCUMENTS

| | | | |
|---|---|---|---|
| 2,391,298 A | * 12/1945 | Davis | ............... 411/508 |
| 3,679,249 A | 7/1972 | Hoffmann | |
| 3,695,652 A | 10/1972 | Ratnikas | |
| 3,794,278 A | * 2/1974 | Frey, Jr. et al. | ............ 411/508 |
| 3,993,410 A | 11/1976 | Lindsay, Jr. | |
| 4,306,820 A | 12/1981 | Nelson | |
| 4,406,557 A | 9/1983 | Suzuki et al. | |
| 4,482,265 A | 11/1984 | Koza | |
| 4,602,887 A | 7/1986 | Konchan | |
| 4,627,304 A | 12/1986 | Dougherty et al. | |
| 4,697,948 A | 10/1987 | Fukuda | |
| 4,750,886 A | 6/1988 | Portelli et al. | |
| 4,981,310 A | * 1/1991 | Belisaire | ............... 411/508 |
| 5,178,479 A | 1/1993 | Brown et al. | |
| 5,299,469 A | 4/1994 | Meyer et al. | |
| 5,601,260 A | * 2/1997 | Shinohara et al. | ........ 411/508 |
| 5,947,631 A | * 9/1999 | Hironaka et al. | ......... 403/397 |
| 6,315,510 B1 | * 11/2001 | Sturies et al. | ............ 411/508 |

* cited by examiner

Primary Examiner—Lynne H. Browne
Assistant Examiner—Ken Thompson
(74) Attorney, Agent, or Firm—Pitney, Hardin, Kipp & Szuch LLP

(57) ABSTRACT

The spring rod end retention clip includes a detent head with retention arms spaced a first distance from the enlarged detent head for engaging panels within a range of relatively lesser thicknesses and a snap fit prong spaced a second distance from the enlarged detent head for engaging panels within a range of relatively greater thicknesses. The retention arms include tapered interior edges so that the retention arms can flex inwardly when a rod is engaged within the detent head and a panel of the range of relatively greater thicknesses is engaged by the detent head.

5 Claims, 4 Drawing Sheets

SPRING ROD END CLIP ENGAGING A RANGE OF PANEL THICKNESSES

BACKGROUND OF THE INVENTION

1. Field of the Invention

This invention pertains to a spring rod end clip for retaining a rod within an aperture. More particularly, this invention pertains to a spring rod end clip which can engage a range of panel thicknesses by employing retention arms for engaging panels with a lesser thickness and snap fit prongs for engaging panels with a greater thickness.

2. Description of the Prior Art

A typical plastic rod end clip seats in an aperture in a panel and allows for some sort of rod, spring or bolt with a right angle bend to be inserted into the rod end clip. An example of a rod end clip is disclosed in commonly assigned U.S. patent application Ser. No. 09/469,262 entitled "Self-Locking Rod End Clip", filed on Dec. 21, 1999 by Binotti et al. This rod end clip has been satisfactory in many respects.

However, improvement in certain aspects is sought.

It is typically important for rod end clips to accommodate some range of panel thicknesses and create a tight fit between itself, the panel aperture and the rod. However, this can be difficult due to the accumulated tolerances of the three different pieces—the diameter of the aperture in the panel, the rod or bolt diameter, and the inner and outer diameters of the plastic clip itself.

Moreover, some applications require that the rod end clips engage two different ranges of thicknesses of panel while incorporating one snap retention finger. This has not been satisfactorily achieved in the prior art.

Some examples of the prior art include U.S. Pat. No. 5,299,469 entitled "Adjustable Linkage Assembly" issued on Apr. 5, 1994 to Meyer et al.; U.S. Pat. No. 5,178,479 entitled "Rod End Clip" issued on Jan. 12, 1993 to Brown et al.; U.S. Pat. No. 4,697,948 entitled "Pivotal Coupling Device" issued on Oct. 6, 1987 to Fukuda; U.S. Pat. No. 4,627,304 entitled "Linkage Anti-Rattle Device and Arrangement" issued on Dec. 9, 1986 to Dougherty et al.; U.S. Pat. No. 4,602,887 entitled "Fastening Arrangement for Vehicle Body Door Latch System" issued on Jul. 29, 1986 to Konchan; and U.S. Pat. No. 4,482,265 entitled "Fastener For Interconnecting Vehicle Door Lock Components" issued on Nov. 13, 1984 to Koza.

OBJECTS AND SUMMARY OF THE INVENTION

It is therefore an object of the present invention to provide a rod end clip which can engage a wide range of panel thicknesses, particularly two ranges of panel thicknesses.

This and other objects are attained by providing a rod end clip which uses retention arms to retain the clip in a panel in a first range of thicknesses (for instance, 1.5–2.0 mm.) and further uses snap fit prongs to retain the clip in a panel in a second range of thicknesses (for instance, 2.0–3.0 mm.). When engaging a panel in the thicker range of thicknesses, the retention arms flex inwardly to provide a tighter fit for the rod and a tight fit into the panel aperture. The retention arms are in constant contact with the inner diameter of the hole in the panel in the thicker range thereby providing support for the rod and compensating for any deviations in the clip while the snap fit prong remains below the panel. The core of the clip is tapered so that when the clip is installed into a panel of the thicker range and the retention arms flex inwardly, the aperture remains clear thereby allowing the rod to pass through the center freely. When engaging a panel in the thinner range of thicknesses, the tapered section at the end of the opening stabilizes the rod while the retention arms provide the main retention and the snap fit prong acts a back-up. The flex finger that retains the rod at the other end prevents the rod from rotating out of the seated area. The flex finger provides an audible click that assures positive insertion.

DESCRIPTION OF THE DRAWINGS further objects and advantages of the invention will become apparent from the following description and claims, and from the accompanying drawings, wherein;

DETAILED DESCRIPTION OF THE PREFERRED EMBODIMENT

Figure 1:
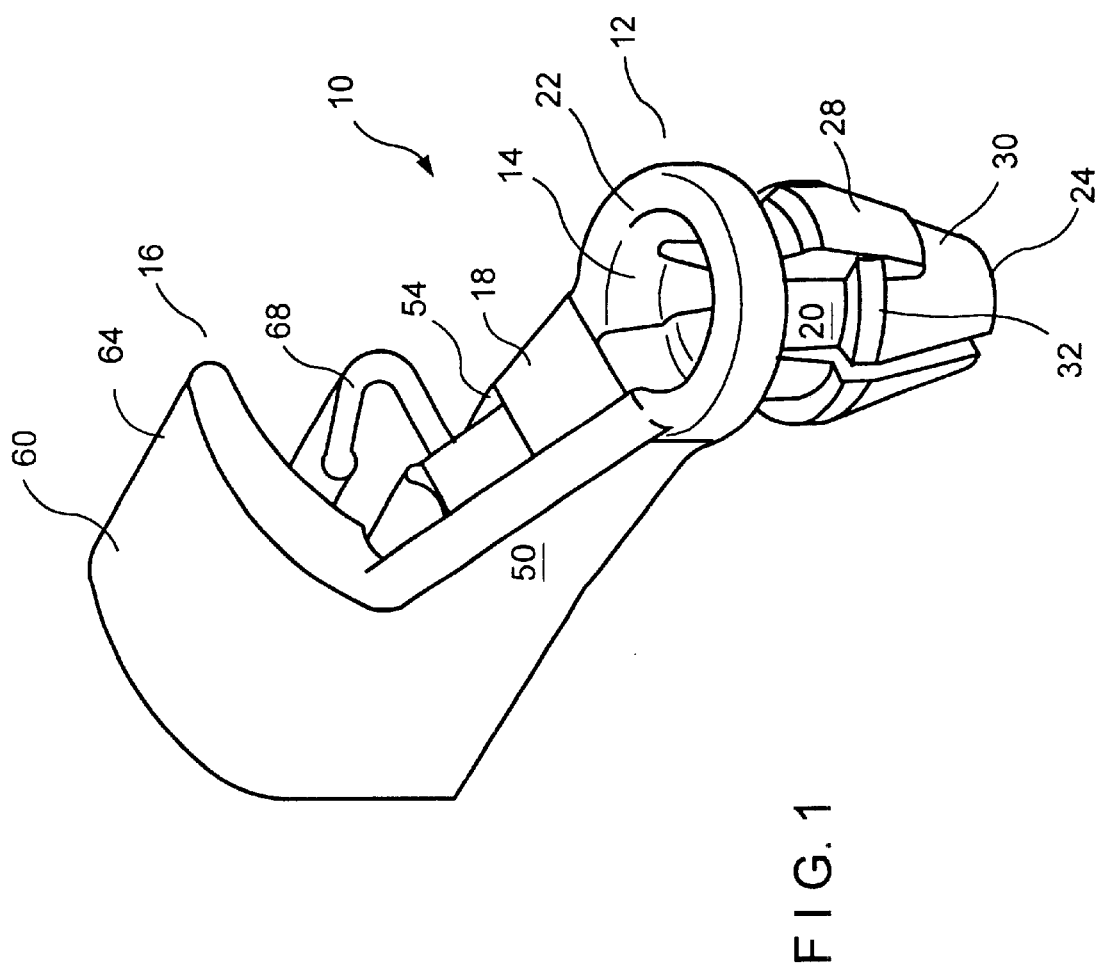
FIG. 1 is a perspective view of the spring rod end clip of the present invention.

Referring now to the drawings in detail wherein like numerals refer to like elements throughout the several views, one sees that FIG. 1 is a perspective view of the spring rod end clip 10 of the present invention. Spring rod end clip 10 is typically made from a single integral piece of molded plastic, although those skilled in the art may recognize a range of equivalent materials.

Spring rod end clip 10 includes detent head 12 which is roughly cylindrical in shape and includes chamfered mouth 14 extending through a longitudinal center thereof. Detent head 12 is intended to be engaged within an aperture in a panel (not shown) and, similarly, mouth 14 is further intended to engage a right-angled end of a rod therewith.

Figure 2:
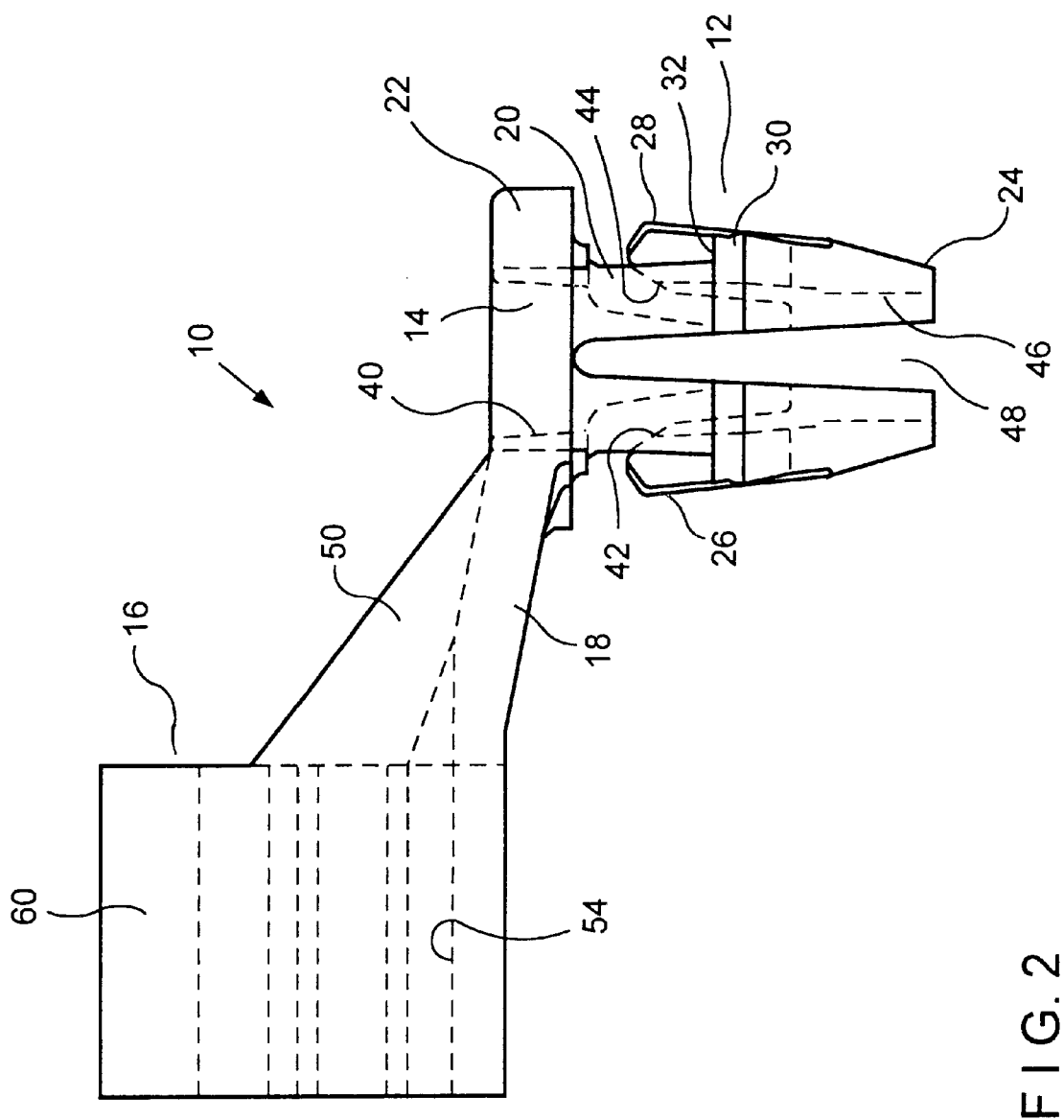
FIG. 2 is a side view, partially in phantom, of the spring rod end clip of the present invention.
Figure 3:
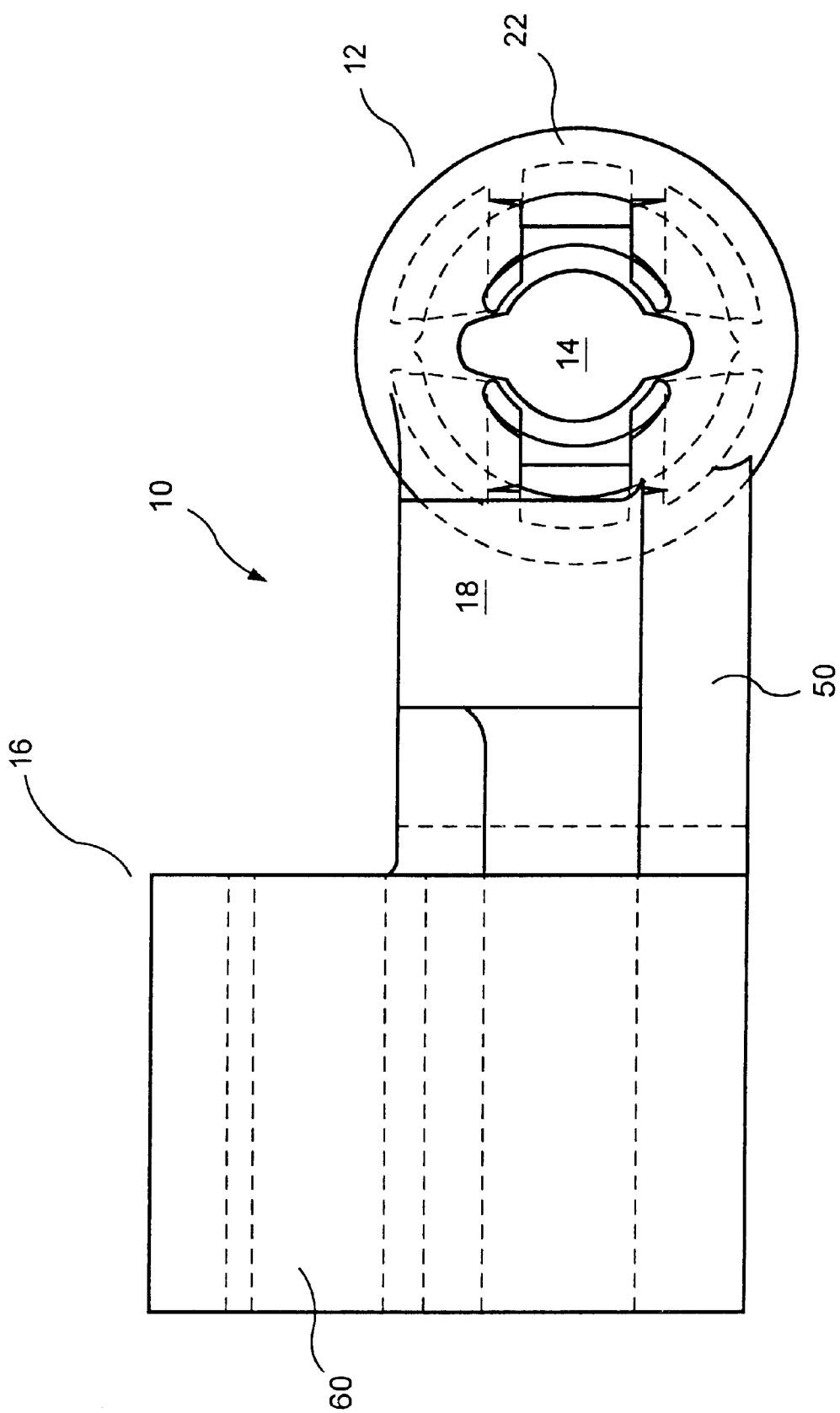
FIG. 3 is a top plan view, partially in phantom, of the spring rod end clip of the present invention.

Spring rod end clip 10 further includes rod retainer assembly 16 which is generally formed at right angle with respect to detent head 12 but, as shown in the illustrated embodiment of FIG. 2, is elevated somewhat with respect to detent head 16 by inclined wall 18.

Figure 4:
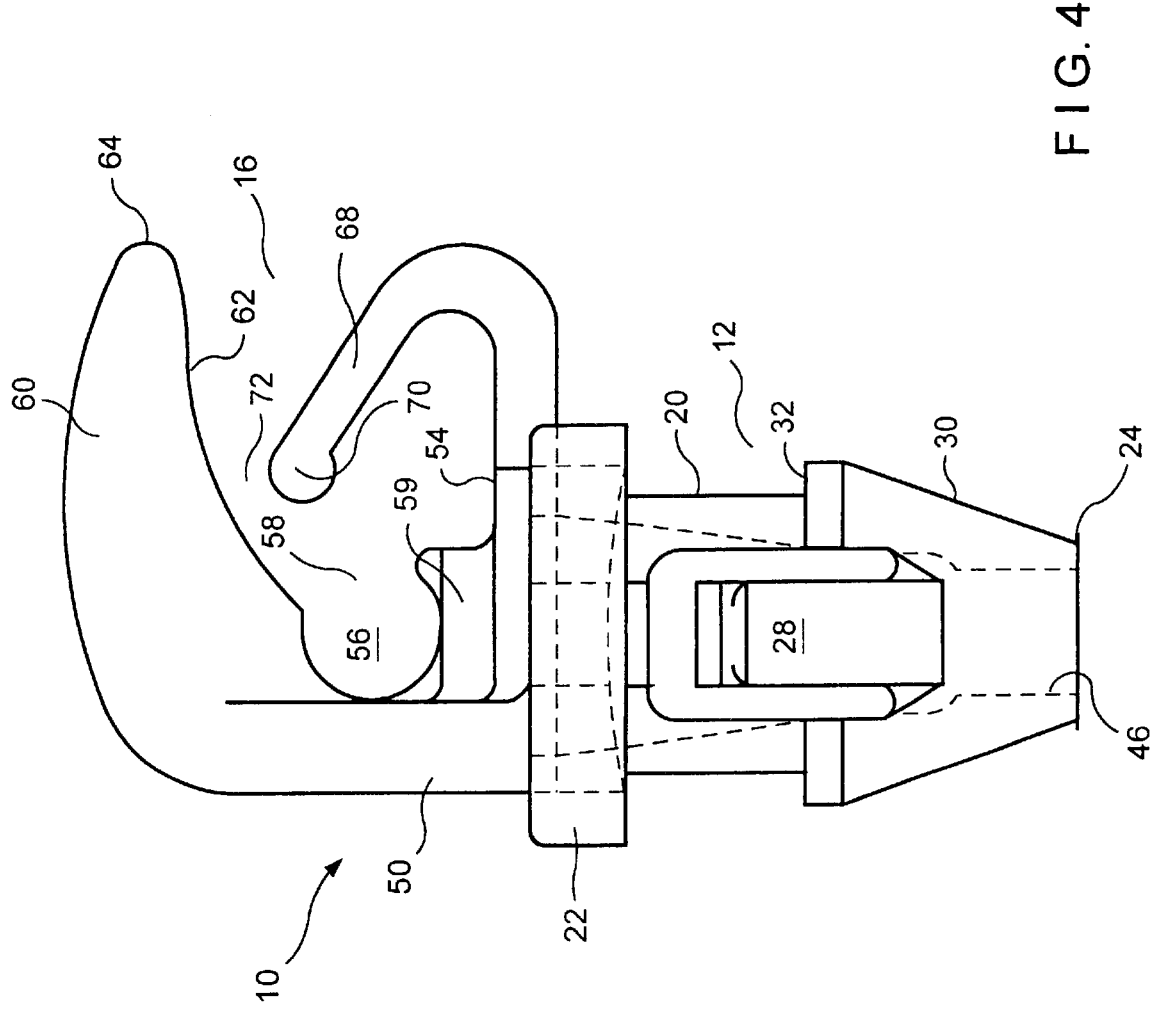
FIG. 4 is a front plan view, partially in phantom, of the spring rod end clip of the present invention.

Detent head 12 includes inner cylindrical section 20 which extends downwardly from enlarged head portion 22. Detent head 12 terminates in tapered distal end 24. Retention arms 26, 28 extend upwardly from tapered distal end 24 and terminate radially outwardly adjacent from inner cylindrical section 20. Similarly, as shown in FIG. 4, inverted conically shaped snap fit prong 30 extends upwardly from tapered distal end 24 terminating in ledge 32. The distance from ledge 32 to the underside of enlarged head portion 22 is greater than the distance between retention arms 26, 28 and the underside of enlarged head portion 22. As will be explained hereinafter, this allows for spring rod end clip 10 to engage panels in two different ranges of thicknesses.

As can be seen from FIG. 2, mouth 14 includes internal chamfered portion 40 near the opening thereof in enlarged head portion 22 in order to properly route the inserted rod. Similarly, the retention arms 26, 28 include a significantly angled sections 42, 44 on the interior thereof, forming a portion of mouth 14, in order to route the rod to straight or cylindrical section 46 of mouth 14 formed within tapered distal end 24. Additionally, longitudinal slot 48 is formed in detent head 12 to provide flexibility of detent head 12 during insertion into an aperture.

Rod retainer clip 16 is attached to enlarged head portion 22 of detent head 12 by inclined wall 18, further supported by wall 50 formed generally at a right angle to inclined wall 18. Rod retainer clip 16 is described in commonly assigned U.S. patent application Ser. No. 09/469,262 entitled "Self-Locking Rod End Clip", filed on Dec. 21, 1999 by Binotti et al., the contents of which are hereby incorporated by reference. Rod retainer clip 16 includes lower planar surface 54. Semi-circular rod seat 56 is formed above lower planar surface 54 and typically has slightly less than a 270° periphery, a mouth 58 with slightly more than a 90° periphery, and a diameter substantially equal to that of a long leg of the engaged rod (not shown) in order to detent engage the long leg. Face 59 extends from the lower portion of mouth 58 of semi-circular rod seat 56 to lower planar surface 54. Guide element 60 with inner concave surface 62. extends above semi-circular rod seat 56. Inner concave face 62 extends from the upper portion of mouth 58 of semi-circular rod seat 56 to distal end 64 of guide element 60 in order to guide the long leg of the rod into semi-circular seat 56 as the short end of the rod pivots in mouth 14.

Flexible finger 68 extends form lower planar surface 54 toward inner concave face 62 and include bulbous distal end 70. Opening 72 is thereby formed between flexible finger 68 and concave face 62.

In order to install spring rod end clip 10, the user typically first installs the shorter end of a right-angled rod (not shown) into mouth 14. The shorter end of the rod is guided into position into, straight or cylindrical portion 46 by internal chamfered portion 40 and significantly angled sections 42, 44. The shorter end of the rod then pivots within mouth 14 until the longer end of the rod is engaged within semi-circular rod seat 56 after passing through opening 72 and momentarily deflecting flexible finger 68 and typically causing an audible click to assure positive insertion.

Detent head 12 is then placed into an aperture in a panel (not shown). In the case of a relatively thinner panel (for instance, in the range of 1.5–2.0 mm. thick), the relatively thinner panel is engaged between retention arms 26, 28 and the underside of enlarged head portion 22. The significantly angled sections 42, 44 stabilize the rod. Moreover, the snap fit prong 30 provides back-up engagement to the aperture.

In the case of the relatively thicker panel (for instance, in the range of 2.0–3.0 mm. thick), the panel is engaged between snap fit prong 30 and the underside of enlarged head portion. In this configuration, retention arms 26, 28 flex inwardly to provide a tighter fit for the rod and a tight fit into the panel aperture. This inward flexing allows the rod to pass through the center freely and is permitted by the significantly angled sections 42, 44 on retention arms 26, 28. In this configuration, retention arms 26, 28 are in constant contact with the inner diameter of the aperture in the panel thereby providing support for the rod and compensating for deviations in the clip while the snap fit prong remains below the panel. In either case, the flexible finger 68 retains the longer end of the rod preventing the rod from rotating out of semi-circular rod seat 56.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A rod end clip including:

a detent head with an aperture therethrough;

a rod retainer clip assembly with at least a portion thereof substantially perpendicular to a longitudinal axis of said aperture;

said detent head including an enlarged head portion; a first engagement element formed said detent head thereby forming a first engagement space of a first distance between said first engagement element and said enlarged head portion; and a second engagement element formed on said detent head thereby forming a second engagement space of a second distance between said second engagement element and said enlarged head portion, wherein said first distance is different from said second distance, wherein said first engagement element can be moved independently of said second engagement element, wherein panels of a first range of thicknesses may be engaged between said first engagement element and said enlarged head portion and wherein panels of a second range of thicknesses may be engaged between said second engagement element and said enlarged head portion.

2. The rod end clip of claim 1 wherein said first engagement element comprises retention arms extending from a distal end of said detent head toward said enlarged head portion.

3. The rod end clip of claim 2 wherein said second engagement element comprises an inverted conical prong extending from said distal end of said detent head toward said enlarged head portion.

4. The rod end clip of claim 3 wherein said second distance is greater than said first distance.

5. The rod end clip of claim 4 said retention arms include tapered interior edges extending into said aperture, whereby said retention arms flex inwardly when a rod is inserted into said aperture and a panel within said second range of thicknesses is engaged between said inverted conical prong and said enlarged detent head.

* * * * *